United States Patent [19]

Choat

[11] Patent Number: 4,989,310

[45] Date of Patent: Feb. 5, 1991

[54] KING PIN PRESSING TOOL

[76] Inventor: Gary Choat, Box 267, Calumet, Okla. 73014

[21] Appl. No.: 426,437

[22] Filed: Oct. 25, 1989

[51] Int. Cl.⁵ .............................................. B23P 19/04

[52] U.S. Cl. ...................................................... 29/252

[58] Field of Search ....................... 29/251, 252, 426.5, 29/281.1, 281.5

[56] References Cited

U.S. PATENT DOCUMENTS 3,359,618 12/1967 Murphy ................................ 29/252

4,477,956 10/1984 Mefford ................................ 29/252

*Primary Examiner*—Robert C. Watson

*Attorney, Agent, or Firm*—H. Jay Spiegel

[57] ABSTRACT

The present invention relates to an improved king pin pressing tool. The tool comprises a three-sided structure forming a chamber having two openings therein, one opening in the top of the structure with a second opening in the back side thereof. The first opening receives a portion of an I-beam and acts to secure the tool against the I-beam during the pressing operation. The second opening in the top of the structure is adapted to receive the king pin as it is pressed out of the I-beam. The chamber that is formed by the three-sided structure is adapted to receive the hydraulic jack that is utilized in pressing the king pin out of the I-beam.

4 Claims, 2 Drawing Sheets

13
31
35
33
7
10
5
9
15
17
19
11
3
21
23
1
27
25

KING PIN PRESSING TOOL

BACKGROUND OF THE INVENTION

The present invention relates to an improved king pin pressing tool. In the prior art, pulling tools that are used to extract pins or the like from force fit connections are known. U.S. Pat. No. 4,091,519 to Durgan and U.S. Pat. No. 4,786,214 to Schmidt, et al. disclose examples of pulling tools. However, neither of these patents include all of the features of the present invention including a portable king pin pressing tool designed to remove king pins from vehicle I-beams.

SUMMARY OF THE INVENTION

The present invention relates to an improved king pin pressing tool. The present invention includes the following interrelated aspects and features:

(a) In a first aspect, the present invention includes an improved king pin pressing tool that comprises a three-sided box which forms a chamber for receiving a jacking means through the open side of the box.

(b) The three-sided box also includes a first opening in the wall opposite the open side of the box, this opening adapted to receive a portion of a vehicle I-beam. The three-sided box also includes a second opening in the top portion thereof, the second opening adapted to receive a ram of a jacking means.

(c) In operation, the improved king pin pressing tool is adapted to be mountable on a vehicle I-beam, the tool having a jacking means placed therein, the jacking means then operated to push out a king pin that is stuck in the I-beam of a vehicle by forcing the jacking means ram through the opening in the top portion of the three-sided box.

Accordingly, it is a first object of the present invention to provide an improved king pin pressing tool.

It is a further object of the present invention to provide an improved king pin pressing tool comprising a three-sided box adapted to receive a jacking means and a vehicle I-beam.

It is a yet further object of the present invention to provide an improved king pin pressing tool that combines portability with the capability of accommodating different I-beam designs.

These and other objects, aspects and features of the present invention will be better understood from the following detailed description of a preferred embodiment when read in conjunction with the appended drawing figures.

SPECIFIC DESCRIPTION OF THE PREFERRED EMBODIMENTS

Figures 1, 2, 3:
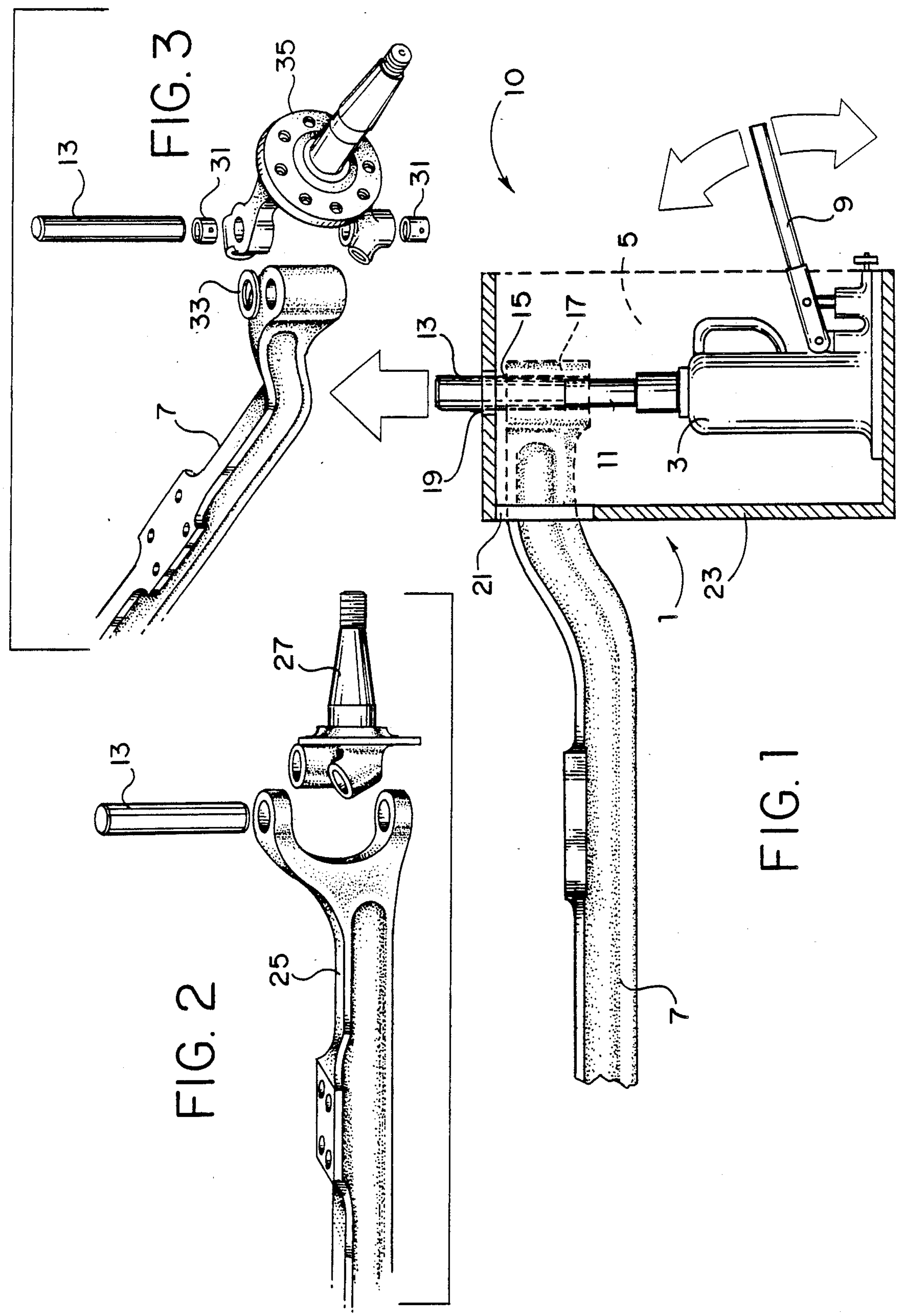
FIG. 1 shows a side view of the improved king pin pressing tool in use.
FIG. 2 shows a perspective view of one type of I-beam-king pin assembly.
FIG. 3 shows a perspective view of another type of I-beam-king pin assembly.

With reference, firstly, to FIG. 1, the improved king pin pressing tool of the present invention in use is generally designated by reference numeral 10 and is seen to include king pin pressing tool 1, hydraulic jack 3 located in the chamber formed by the king pin pressing tool, and vehicle I-beam 7. As can be further seen from the drawing, hydraulic jack 3 by movement of lever 9, as indicated by the arrows, operates to propel ram 11 against the stuck king pin 13 and push the king pin 13 through the opening 15 in end portion 17 of I-beam 7 and also through the opening 19 in the king pin pressing tool 1.

The I-beam 7 is inserted into king pin pressing tool 1 through opening 21 in side plate 23 of the king pin pressing tool 1.

FIGS. 2 and 3 illustrate two different types of I-beam designs that may be utilized with the king pin pressing tool. FIG. 2 shows an exploded "Elliott Type" I-beam 25 with spindle 27 and king pin 13. FIG. 3 depicts an exploded reverse type "Elliott" I-beam 7, as shown in FIG. 1, including bushings 31, shim 33, spindle 35 and king pin 13. The manner in which the king pin pressing tool may be utilized with these different types of I-beams will be described hereinafter.

Figure 4:
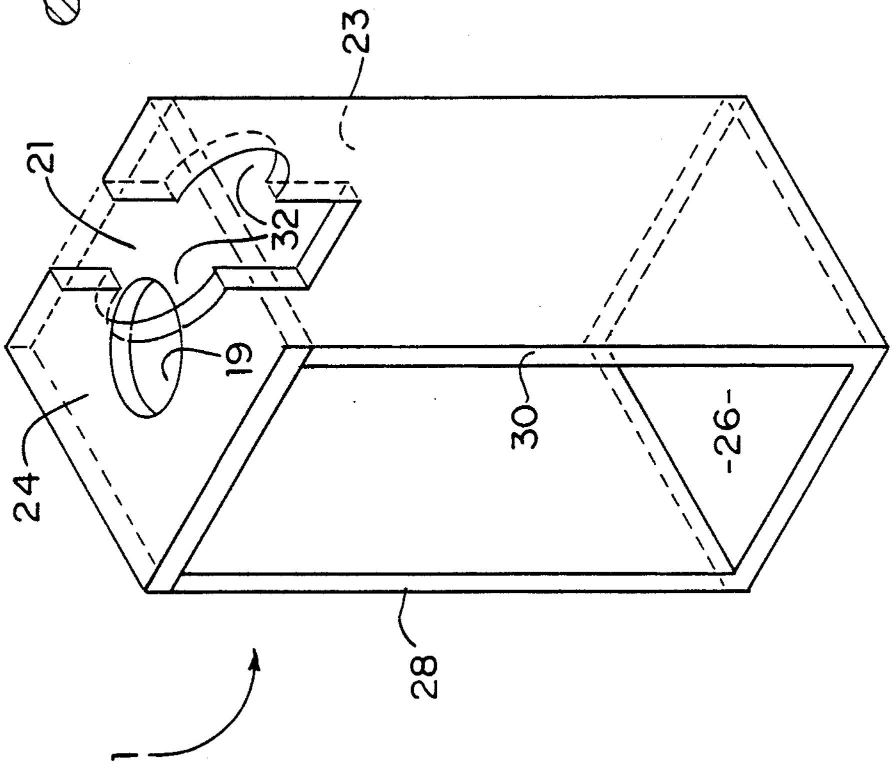
FIG. 4 shows a perspective view of the king pin pressing tool.

FIG. 4 shows a perspective view of the king pin pressing tool 1 more clearly illustrating the component parts and openings therein. The king pin pressing tool 1 includes a top plate 24 having an opening 19 therein, a bottom plate 26, a back side plate 23 having opening 21 therein and side plates 28 and 30. Circular opening 19 in top plate 24 is adapted in shape to permit a king pin when being pushed from a particular type of I-beam to travel through the opening 19 in order to be completely removed from the I-beam itself.

Figure 5:
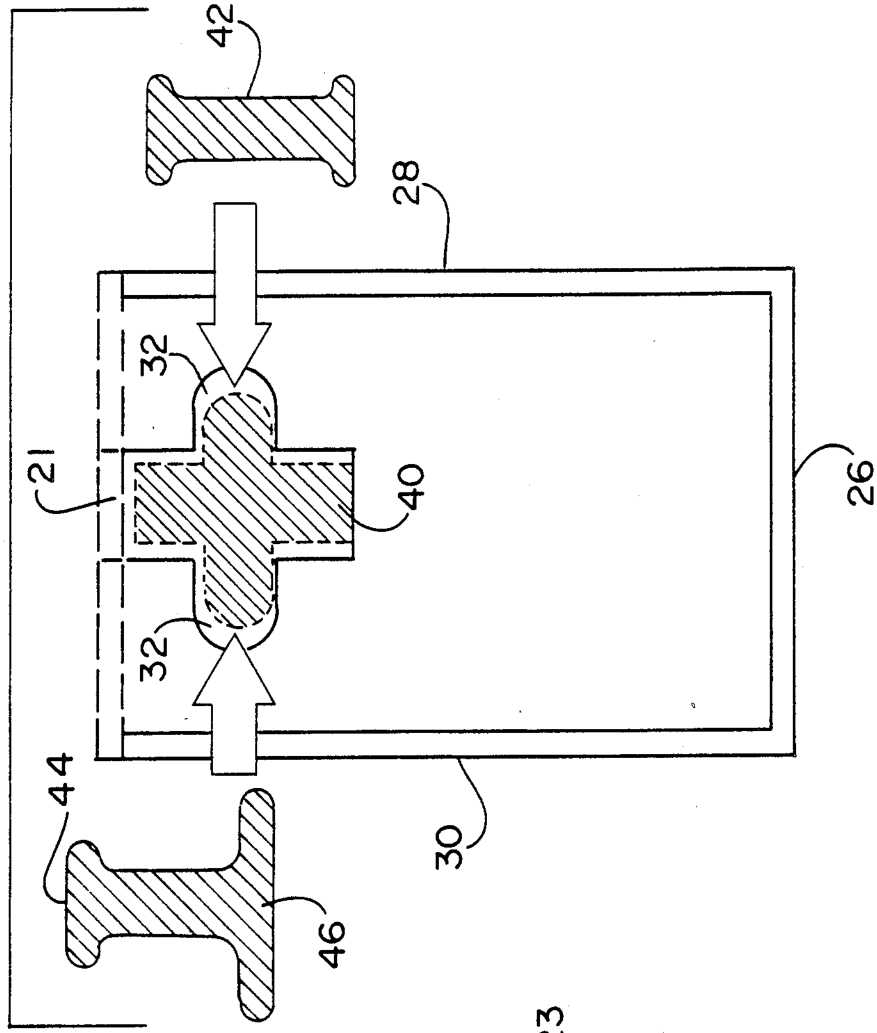
FIG. 5 shows a back view of the king pin pressing tool with various I-beam configurations.

With reference to FIG. 5, the opening 21 in back side plate 23 is adapted to receive both Ford and Chevrolet type I-beam construction by the vertically aligned rectangular portion, the sides thereof having semicircular cutouts 32, these cutouts adapted to receive the Chevrolet-type I-beam 40 with the vertically aligned portion of opening 21 adapted to receive the Ford-type I-beam 42. Additionally, an inverted Elliott Type I-beam 44 may also be inserted into opening 21 with the lower portion 46 of I-beam 44 fitting into the horizontally aligned portion of opening 21 created by cutouts 32.

In operation, prior to removing the king pin from the I-beam, the tire, wheel, brake assembly, bearings, and parts associated with these components are removed, and the spindle and I-beam have been cleaned of any excess grease or oil to prevent fires. The next step includes cutting off the upper and lower portion of the king pin from the I-beam, being careful not to damage either the spindle or the I-beam. This cutting-off step is done sequentially, first cutting the king pin bearing below the I-beam and above the lower bushing section of the spindle. The king pin bearing should be cut into two halves with a cutting torch, one cut on each side of the bearing. After this cutting step the bearing will fall out, leaving part of the lower section of the king pin exposed. This exposed lower section of the king pin should now be cut off also. In the next step, the spindle should be raised so as to expose the upper one-third of the king pin, and this portion of the king pin should also be cut off. At this point, the spindle may be removed and the improved king pin pressing tool inserted onto the I-beam. The king pin pressing tool rests on top of the I-beam with the center of the king pin hole aligned with the opening 19 in the top plate 24 of the tool. Once this alignment procedure is completed, a hydraulic jack may then be used to push out the stuck king pin as described hereinabove.

The hydraulic jack that is inserted into the chamber of the king pin pressing tool may also include an adjustable ram, the adjustable ram having a feature that enables it to be screwed out to lengthen the travel of the ram. Additionally, the ram may be interchangeable such that different diameters of king pins may be removed using the same hydraulic jack.

In addition to the hydraulic jack, it may be necessary to heat the I-beam to permit the king pin to be removed. However, the use of heating means may be necessary only in the severest of cases. Finally, different sized hydraulic jacks may be used depending on the type of vehicle being serviced. For example, a one-half ton vehicle may require a smaller sized jack than a vehicle such as a tractor trailer or a bus. Typically, it is anticipated that a ten to twenty ton hydraulic jack should be sufficient to remove king pins in most vehicle applications.

The exact dimensions of the various components of the king pin pressing tool may vary according to the intended vehicle that is to be serviced. A typical range of dimensions may include the king pin pressing tool as 18 inches high by 8 inches wide by 5 inches deep, with an opening in the top plate of $1\frac{3}{4}$ inches and the vertically aligned rectangular opening in the back side plate being 3 inches by $3\frac{1}{3}$ inches with a $5\frac{1}{4}$ inch horizontal distance between the central edges of the cutout portions 32. The plates may be a cold rolled steel being $\frac{1}{2}$ inch to $\frac{3}{4}$ inch in thickness.

The king pin pressing tool may also include features such as handles to permit ease of movement of the tool or a jack support plate in place of the base plate 26 made up of a series of rods or bars that are connected between the two side plates 28 and 30.

In the prior art, the removal of stuck king pins and vehicle I-beams has been performed using hammers or chisels to hammer out the stuck king pin. Using the king pin pressing tool of the present invention, the removal of a stuck king pin is easily accomplished without the necessity of hammering or chiseling out such a pin. As such, the removal of king pins during mechanical work on vehicles is easily facilitated using the king pin pressing tool. Additionally, the king pin pressing tool is portable in nature, allowing the tool to be moved among a variety of vehicles that are presently being serviced.

As such, an invention has been disclosed in terms of a preferred embodiment thereof which fulfills each and every one of the objects of the present invention as set forth hereinabove and provides a new and improved king pin pressing tool of great utility and novelty.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed:

1. An improved king pin pressing tool comprising:
(a) a bottom support means adapted to support a jacking means;
(b) a pair of opposed side plates;
(c) a back plate having an opening therein for receiving a king pin containing portion of a vehicle suspension means, said back side plate opening being configured to receive both an I-beam suspension means having a vertically rectangular configuration and an I-beam suspension means and spindle combination having a cross-shaped configuration;
(d) a top plate having an opening therein for receiving a king pin as said king pin is removed from said vehicle suspension means by said jacking means;
(e) wherein said back plate, said pair of opposed side plates and said top plate form a chamber, said chamber adapted to receive said jacking means.

2. The invention of claim 1, further comprising a jacking means occupying said chamber.

3. The invention of claim 1, wherein said king pin pressing tool is made out of cold-rolled steel.

4. The invention of claim 1, wherein said top plate opening is circular.

* * * * *